United States Patent Office 2,927,931
Patented Mar. 8, 1960

2,927,931

EPOXIDATION OF UNSATURATED COMPOUNDS

Benjamin Phillips and Paul S. Starcher, Charleston, and Donald L. MacPeek, South Charleston, W. Va., assignors to Union Carbide Corporation, a corporation of New York No Drawing. Application November 13, 1957
Serial No. 696,044

14 Claims.  (Cl. 260—348.5)

This invention relates to the epoxidation of unsaturated organic compounds. In one aspect this invention relates to the selective monoepoxidation of vinyl and allyl α,β-olefinic esters wherein the valences of the alpha and beta carbon atoms of the carboxylic acid residue, i.e.,

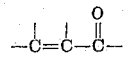

of said olefinic esters are satisfied by at least two hydrocarbon groups, to produce the corresponding vinyl and allyl glycidic esters.

The synthesis of certain types of 2,3-epoxy esters is well known in the art. In 1892, Erlenmeyer produced ethyl β-phenyl-α,β-epoxypropionate by the interaction of benzaldehyde and ethyl chloroacetate in the presence of sodium. Between 1904 and 1932 Erlenmeyer's work was expanded by Darzens who generally favored the use of sodium ethoxide as the condensing agent. A modification by Darzens of his general procedure was the reaction of ketones or aldehydes with ethyl dichloroacetate and dilute magnesium amalgam, followed by hydrolysis of the product to produce β-hydroxy-α-chloroester. Treatment with sodium ethoxide provided the glycidic esters. Among the disadvantages of the Darzens process are included small yields, undesirable side reactions, wide boiling range, e.g., 5° to 10° C., of many reported glycidic esters indicating the presence of impurities such as isomeric carbon or oxygen alkylation products, recommended use of an inert atmosphere, economic barriers presented by the high cost of starting materials, and others.

A similar reaction with methyl sorbate and perbenzoic acid in chloroform over a period of from about 5 to 10 days gave only methyl 4,5-epoxy-2-hexenoate and not the 2,3-epoxy or glycidic type of ester. Another method reported in the literature involved the reaction of methyl crotonate and perbenzoic acid to prepare methyl 2,3-epoxybutyrate. A yield of 44 percent was obtained by a procedure involving a reaction period of several months at 8° C. in the absence of light. A most recent work reported the epoxidation of acrylate, α-methylacrylate, and crotonate esters by the use of the prohibitively expensive peroxytrifluoroacetic acid in a system buffered with disodium hydrogen phosphate. Almost universally a solvent such as methylene chloride or ethylene dichloride was required to minimize olefin polymerization.

The work of several investigators was summarized by Swern (Chem. Rev., 45, 50–51) in 1949 with respect to the epoxidation of alpha,beta-unsaturated esters with perbenzoic acid. His conclusions stated that the reaction of perbenzoic acid with an olefin bearing a carbonyl or carboalkoxy (—COOR) group in close proximity to the ethylenic bond was either slowed down to an exaggerated degree or prohibited by the presence of that group.

The present invention contemplates the preparation of vinyl or allyl glycidic esters by the reaction of peracetic acid with the corresponding alpha,beta-olefinic ester of vinyl or allyl alcohol, wherein the valences, collectively, of the alpha and beta carbon atoms of the carboxylic acid residue, i.e.,

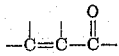

of said olefinic ester are satisfied by at least two hydrocarbon groups. By the term "alpha,beta-olefinic ester of vinyl or allyl alcohol," as used herein, is meant an olefinically unsaturated ester wherein the carboxylic acid residue of said ester contains the double bond in the 2-position, i.e.,

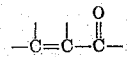

wherein the valences, collectively, of the alpha and beta carbon atoms of said carboxylic acid residue are satisfied by at least two hydrocarbon groups; wherein the alcohol residue of said ester can be considered to be derived from vinyl or allyl alcohol; and wherein the ester molecule is composed of carbon, hydrogen and oxygen atoms, said oxygen atoms being present in ester linkage only, i.e.,

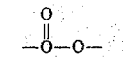

For brevity, the term "alpha,beta-olefinic ester of vinyl or allyl alcohol" oftentimes will be hereinafter referred to as an alpha,beta-olefinic ester.

Accordingly, one or more of the following objects will be achieved by the practice of this invention.

It is an object of this invention to provide a novel process for preparing vinyl and allyl glycidic esters by the selective monoepoxidation of the corresponding organic alpha,beta-olefinic ester of vinyl or allyl alcohol, said alpha,beta-olefinic ester containing at least two hydrocarbon groups attached to the carboxylic acid residue of the ester. It is another object of this invention to provide a novel monoepoxidation process wherein complicating and undesirable side reactions are minimized. Other objects will become apparent to those skilled in the art in the light of the instant specification.

In order to facilitate the understanding of the instant invention the alpha,beta-olefinic ester employed as reagent in the instant selective monoepoxidation process is characterized by the following general formula:

I

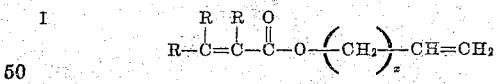

wherein x is an integer less than two and including zero; and wherein each R, individually, can be a hydrogen atom or a hydrocarbon group except that two of the three variables designated as R are always hydrocarbon groups, for example, alkyl, aryl, aralkyl, alkaryl, and cycloalkyl groups. In a preferred aspect two or more of the R variables are alkyl groups. Exemplary radicals for R include, among others, methyl, ethyl, propyl, isopropyl, butyl, amyl, isoamyl, hexyl, 2-ethylhexyl, octyl, 3,5-dimethyloctyl, decyl, dodecyl, octadecyl, cyclopentyl, cyclohexyl, phenyl, tolyl, butylphenyl, benzyl, phenethyl, phenylpropyl, and the like.

Typical α,β-olefinic ester compounds conforming to structural Formula I supra which can be selectively monepoxidized to the corresponding vinyl or allyl glycidic esters by the practice of this invention include, among others, vinyl α-methylcrotonate, allyl α-methylcrotonate, vinyl α - ethylcrotonate, allyl α - ethylcrotonate, vinyl α - propylcrotonate, allyl α - butylcrotonate, vinyl α-ethyl-β-propylacrylate, allyl α-ethyl-β-amylacrylate, vinyl α,β-dimethyl-β-propylacrylate, vinyl α-ethyl-β-propyl-β- butylacrylate, allyl β-ethyl-β-hexylacrylate, allyl α-phenylcrotonate, vinyl β-phenethyl-β-ethylacrylate, allyl α-benzyl-β-propylacrylate, vinyl α-tolyl-β-butylacrylate, vinyl α-cyclohexylcrotonate, allyl α-cyclopentyl-β-ethylacrylate, and the like.

The monoepoxide compounds, i.e., vinyl and allyl glycidic esters, resulting from the epoxidation are characterized by the following structural formula:

II 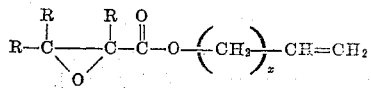

wherein $x$ and R have the aforesaid meanings set out in Formula I supra. Among the monoepoxides produced by the instant invention include vinyl 2-methyl-2,3-epoxybutyrate, allyl 2-methyl-2,3-epoxybutyrate, vinyl 2-ethyl-2,3-epoxybutyrate, allyl 2-ethyl-2,3-epoxybutyrate, vinyl 2-propyl-2,3-epoxybutyrate, allyl 2-butyl-2,3-epoxybutyrate, vinyl 2-ethyl-2,3-epoxyhexanoate, allyl 2-ethyl-2,3-epoxyoctanoate, vinyl 2,3-dimethyl-2,3-epoxyhexanoate, vinyl 2-ethyl-3-propyl-2,3-epoxyheptanoate, allyl 3-ethyl-2,3-epoxynonanoate, allyl 2-phenyl-2,3-epoxybutyrate, vinyl 3-phenethyl-2,3-epoxypentanoate, allyl 2-benzyl-2,3-epoxyhexanoate, vinyl 2-tolyl-2,3-epoxyheptanoate, vinyl 2-cyclohexyl-2,3-epoxybutyrate, allyl 2-cyclopentyl-2,3-epoxypentanoate, and the like.

The amount of peracetic acid employed in the epoxidation reaction does not appear to be critical. The monoepoxidation of the α,β-olefinic ester reagents conforming to Formula I above is highly selective, and consequently, oxirane oxygen is introduced at the site of the carbon to carbon double bond of the carboxylic acid residue, i.e.,

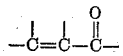

to form the corresponding monoepoxidized product, i.e., vinyl or allyl glycidic ester. Theoretically, however, in the epoxidation of the α,β- olefinic ester with peracetic acid, two mols of said acid can react with one mol of said ester to form the corresponding diepoxide product. Hence, the reaction period should be conducted for a period of time sufficient to consume up to one mol of peracetic acid per mol of ester reagent. The amount of peracetic acid consumed during the reaction can be readily determined by running an analysis on samples of the reaction mixture at various intervals to ascertain the quantity of unreacted peracetic acid therein. From this determination the amount of peracetic acid consumed can be simply calculated. In general, the concentration of peracetic acid employed can vary from about 0.2 mol, and lower, to about 10 mols, and higher, per mol of α,β-olefinic ester reagent. The upper limit regarding the quantity of peracetic acid used is governed mainly by economic and product recovery considerations. In a preferred aspect, from about 0.2 to about 2.0 mols of peracetic acid per mol of α,β-olefinic ester reagent can be employed, and the reaction period is conducted for a period of time sufficient to consume up to one mol of peracetic acid per mol of peracetic acid per mol of α,β-olefinic ester, i.e., the reaction period is conducted for a period of time sufficient to introduce oxirane oxygen at the site of the carbon to carbon double bond of the carboxylic acid residue of the ester reagent, thus selectively producing the monoepoxidized product, vinyl or allyl glycidic ester.

The epoxidation reaction can be conducted at a temperature in the range of from about 0° to 100° C., and preferably from about 25° to about 90° C. As a practical matter, the choice of the particular temperature at which to effect the monoepoxidation reaction depends, to an extent, on the nature of the alpha,beta-olefinic ester reagent. The reaction is somewhat exothermic and cooling means, such as a water jacket encompassing the reaction vessel, can be provided to prevent any possible "runaway" temperatures.

As stated previously the reaction is conducted for a period of time sufficient to consume up to one mol of peracetic acid per mol of α,β-olefinic ester employed. Periodical analysis of samples of the reaction mixture to determine the quantity of peracetic acid consumed during the epoxidation reaction can be readily performed by the operator. For example, the operator can intermittently remove a small sample of the reaction mixture and add it, dropwise, to 50 cc. of acetic acid containing 10 cc. of saturated aqueous potassium iodide. The resulting solution will be darkly colored due to the release of iodine. Subsequently, this colored mixture is titrated with 0.1 N of sodium thiosulfate until the mixture becomes colorless. This titration is a measure of the unreacted peracetic acid from which the amount of peracetic acid consumed is readily determined. In general, the reaction period will vary depending on the concentration of the reactants, the particular α,β-olefinic ester employed, the temperature, the type and degree of agitation of the reaction mixture, and other factors. According to the correlation of the above-illustrated factors the reaction period which is necessary to effect the consumption of up to one mol of peracetic acid per mol of α,β-olefinic ester, i.e., introduce oxirane oxygen at the site of the carbon to carbon double bond of the carboxylic acid residue of said ester, can be as short as minutes in length or it can be as long as 12 hours or more, e.g., from about 30 minutes to about 18 hours.

It is desirable to conduct the epoxidation reaction with equipment which will not foster the polymerization of the α,β-olefinic ester or catalyze the decomposition of peracetic acid. Equipment constructed of glass, stainless steel, aluminum and the like has been shown to be adequate for this purpose. If desired, a polymerization inhibitor or retarder such as hydroquinone, 2,4-dinitrophenol, 2,4-dinitro-m-cresol, and the like can be incorporated into the reaction mixture in an amount sufficient to prevent possible polymerization of the α,β-olefinic ester reagent. Provision can be made for heating and/ or cooling the reactor contents. A suitable reflux-type condenser can be attached as an integral part of the equipment.

The particular manner of adding the reagents, i.e., the α,β-olefinic ester and peracetic acid, to the reaction vessel is not narrowly critical. One desirable procedure is to charge the α,β-olefinic ester to the reaction vessel and subsequently heat said ester to a predetermined temperature. At this temperature, and generally under constant agitation, peracetic acid, preferably in an inert medium such as ethyl acetate, acetone, and the like, is fed to the reaction vessel. Cooling is provided, if necessary, to compensate for the heat generated by the reaction. The reaction acn be terminated when up to one mol of peracetic acid per mol of α,β-olefinic ester has been consumed, or before this point if desired. The reaction mixture then can be separated into its various components, such as, by fractional distillation to recover the selectively monoepoxidized product, i.e., vinyl or allyl glycidic ester.

The use of an inert organic medium is not a prerequisite in the epoxidation reaction, However, it has been observed that a faster and cleaner reaction is effected by employing the peracetic acid in an inert organic medium such as ethyl acetate, acetone, and the like. A solution comprising from about 10 to 50 weight percent of peracetic acid, based on the total weight of peracetic acid and inert organic medium, is satisfactory; from about 20 to 40 weight percent of peracetic acid, based on the solution weight, is preferred.

The relative ease in which the monoepoxidized products result from the instant epoxidation reaction between peracetic acid and an α,β-olefinic ester as characterized by Formula I supra is indeed surprising. According to various authorities and experts in the epoxy field such as Swern, supra, the epoxidation of an alpha,beta-olefinic ester, i.e., an ester wherein a double bond is conjugated with a carbonyl group in the carboxylic acid portion of the ester molecule, with an epoxidizing agent such as perbenzoic acid is effected with extreme difficulty, if at all. The successful epoxidation process afforded by the practice of the instant invention is completely unpredictable on the basis of information available in the literature. The laborious and arduous routes pursued by several skilled chemists in the epoxy field to effect the introduction of oxirane oxygen at the site of the alpha, beta double bond which is in conjugation with a carbonyl group is testimony lending to the unpredictability or the extreme difficulty encountered by a direct epoxidation route, i.e., a single-step epoxidation process. The instant invention, it is submitted, constitutes a definite and patentable advance in the epoxy art.

The advantages of the instant process are readily apparent from the single-step nature of the operation. In addition, an economic source of epoxide oxygen is utilized, i.e., peracetic acid, rather than expensive haloacetates and difficulty handled agents such as sodium amide or other prohibitively expensive peroxygen chemicals such as perbenzoic acid or peroxytrifluoroacetic acid.

The vinyl and allyl glycidic esters prepared by the practice of this invention are a useful class of compounds. These compounds are bifunctional by virtue of reactive epoxy and terminal ethylenic groups and thus are useful as monomers which can be polymerized to form infusible polymers; note U.S. Patent 2,680,109. They can be hydrolyzed to glycidic acids the utility of which is well recognized. Decarboxylation of the resulting glycidic acids usually yield aldehydes or ketones depending upon whether the alpha substituent of said glycidic acid is a hydrogen or an alkyl group. The vinyl and allyl glycidic esters of this invention also can be employed as stabilizers for chlorinated rubber.

The following examples are illustrative.

Example 1

A solution (528 grams) of peracetic acid (25 weight percent) in ethyl acetate was added over a period of 70 minutes at 40° C. to 952 grams of allyl α-ethyl-β-propylacrylate. After an additional two hour reaction period at 40° C. the temperature was raised to 50° C. for 5.75 hours. The reaction mixture was distilled and a fraction (112 grams) was isolated. This fraction had an infrared spectrum which exhibited strong bands characteristic of terminal double bonds. No bands characteristic of trisubstituted or conjugated double bonds were observed. The above-said fraction, ascertained to be allyl 2-ethyl-2,3-epoxyhexanoate, had the following properties:

Boiling point _____ 91° C./3 mm. of Hg.
Purity by HBr method for epoxide
  analysis _____ 100 percent.
Saponification equivalent _____ 195 (calculated 196).
$n_D^{30}$ _____ 1.4415–1.4425.

| Elemental Analysis: | Found (%) | Calculated (%) |
|---|---|---|
| Carbon | 66.81 | 66.6 |
| Hydrogen | 9.31 | 9.08 |

Example 2

To 364 grams of allyl α-ethyl-β-propylacrylate (2 mols) were added dropwise over a period of two hours 1490 grams of a 25.5 weight percent solution of peracetic acid in ethyl acetate at a temperature of 50°–60° C. The temperature was maintained at 60° C. for a few hours, and subsequently the reaction mixture was distilled under reduced pressure with 700 grams of ethylbenzene to remove ethyl acetate and to azeotrope out the excess peracetic acid and the acetic acid. After removal of the ethylbenzene the crude reaction mixture was vacuumed distilled rapidly on a one-plate column. The distillate was fractionated and a 113 gram fraction was recovered therefrom. This fraction (28 percent yield) was subsequently determined to be allyl 2,3-epoxy-2-ethylhexanoate.

The above 113 gram fraction and a similar fraction (52 grams) prepared from a different run employing the same ingredients in the same manner were fractionated and the resulting fractions (80 grams) boiling at 83°–84° C./1.5 mm. of Hg and having a refractive index ($n_D^{30}$) range of 1.4402–1.4407 were composited and analyzed. The following results were obtained:

Purity by HBr method for epoxide
  analysis _____ 100.2 percent.
Saponification equivalent _____ 196 (calculated 198).

| Elemental Analysis: | Found (%) | Calculated (%) |
|---|---|---|
| Carbon | 66.76 | 66.6 |
| Hydrogen | 9.12 | 9.08 |

Infrared spectrum: Strong bands characteristic of terminal double bonds. No bands characteristic of trisubstituted or conjugated double bonds.

To further chemically prove the structure of the above-analyzed fractions, 2 grams of sodium metal was dissolved in 65 grams of 2-ethylhexanol. To this solution there were added 24.8 grams of the above-analyzed fractions and 100 grams of dry benzene. The resulting mixture was heated under reflux on a still equipped with a fractionation column. A mixture (40 milliliters) of benzene and allyl alcohol was removed slowly at the still head at a temperature of 77°–78° C. (Reported binary azeotrope, boiling point 76.8° C., 17.4 percent allyl alcohol.) Treatment of 10 milliliters of the distillate with one milliliter of alpha-naphthyl isocyanate gave the alpha-naphthyl urethan of allyl alcohol which after recrystallization from carbon tetrachloride melted at 107.5°–108° C. (Reported melting point 109° C.) The monoxide was identified as allyl 2-ethyl-2,3-epoxyhexanoate.

It is obvious that various modifications of this invention can be made by those skilled in the art without departing from the spirit and scope thereof.

What is claimed is:

1. An epoxidation process which comprises contacting an alpha, beta-olefinic ester having the formula:

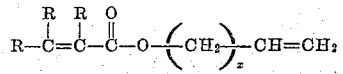

wherein x is an integer less than two and including zero; and wherein each R is individually selected from the group consisting of hydrogen, alkyl, cyclopentyl, cyclohexyl, phenyl, tolyl, butylphenyl, benzyl, phenethyl, and phenylpropyl wherein at least two of the R variables are always hydrocarbon groups; with peracetic acid, for a period of time sufficient to consume up to one mol of peracetic acid per mol of said alpha-beta-olefinic ester thus selectively mono-epoxidizing said ester at the site of the alpha and beta carbon atoms of the carboxylic acid residue of said ester.

2. The process of claim 1 wherein said peracetic acid is employed as a solution in an inert organic medium.

3. The process of claim 2 wherein the epoxidation reaction is conducted at a temperature in the range of from about 0° to about 100° C.

4. The process of claim 3 wherein the epoxidation reaction is conducted at a temperature in the range from about 25° to about 90° C.

5. The process for preparing vinyl polyalkyl-substituted glycidic ester which comprises contacting the corresponding alpha,beta-olefinic ester of vinyl alcohol, said alpha,beta-olefinic ester having at least two alkyl substituents attached to the alpha-beta-carboxylic acid residue thereof, with peracetic acid at a temperature in the range of from about 0° to about 100° C., and for a period of time to consume up to one mole of peracetic acid per mol of said alpha,beta-olefinic ester.

6. The process of claim 5 wherein said peracetic acid is employed as a solution in an inert organic medium.

7. The process of claim 6 wherein said inert organic medium is ethyl acetate.

8. The process of claim 7 wherein said alpha,beta-olefinic ester is vinyl α,β-dialkylacrylate and said vinyl polyalkyl-substituted glycidic ester is vinyl 2,3-dialkyl-2,3-epoxypropionate.

9. The process of claim 8 wherein said vinyl α,β-dialkylacrylate is vinyl 2-ethyl-3-propylacrylate and said vinyl 2,3-dialkyl-2,3-epoxypropionate is vinyl 2-ethyl-2,3-epoxyhexanoate.

10. The process for preparing allyl polyalkyl-substituted glycidic ester which comprises contacting the corresponding alpha,beta-olefinic ester of allyl alcohol, said alpha,beta-olefinic ester having at least two alkyl substituents attached to the alpha,beta-carboxylic acid residue thereof, with peracetic acid, at a temperature in the range of from about 0° to about 100° C., and for a period of time to consume up to one mol of peracetic acid per mol of said alpha,beta-olefinic ester.

11. The process of claim 10 wherein said peracetic acid is employed as a solution in an inert organic medium.

12. The process of claim 11 wherein said inert organic medium is ethyl acetate.

13. The process of claim 12 wherein said alpha,beta-olefinic ester is allyl α,β-dialkylacrylate and said allyl polyalkyl-substituted glycidic ester is allyl 2,3-dialkyl-2,3-epoxypropionate.

14. The process of claim 13 wherein said allyl α,β-dialkylacrylate is allyl 2-ethyl-3-propylacrylate and said allyl 2,3-dialkyl-2,3-epoxypropionate is allyl 2-ethyl-2,3-epoxyhexanoate.

References Cited in the file of this patent

UNITED STATES PATENTS

| | | |
|---|---|---|
| 2,493,090 | Shelton | Jan. 3, 1950 |
| 2,680,109 | Stevens et al. | June 1, 1954 |
| 2,748,148 | Fancher | May 29, 1956 |
| 2,779,771 | Phillips et al. | Jan. 29, 1957 |
| 2,783,250 | Payne et al. | Feb. 26, 1957 |
| 2,785,185 | Phillips et al. | Mar. 12, 1957 |
| 2,786,068 | Frostick et al. | May 19, 1957 |

OTHER REFERENCES

Swern; J.A.C.S., vol. 69, pp. 1692–1698 (1947).

Elderfield: Heterocyclic Compounds, vol. 1, pp. 5–7 (1950).